United States Patent

[11] 3,627,754

| [72] | Inventors | Robert Ye-Fong Ning<br>West Caldwell;<br>Leo Henryk Sternbach, Upper Montclair,<br>both of N.J. |
|---|---|---|
| [21] | Appl. No. | 37,021 |
| [22] | Filed | May 13, 1970 |
| [45] | Patented | Dec. 14, 1971 |
| [73] | Assignee | Hoffmann-La Roche Inc.<br>Nutley, N.J. |

[54] PROCESS FOR PREPARING 7-LOWER ALKANOYL BENZODIAZEPINES UTILIZING CERIC SALTS
5 Claims, No Drawings

[52] U.S. Cl. .................................................. 260/239.3 D,
260/562 N, 260/999
[51] Int. Cl. .................................................. C07d 53/06

[50] Field of Search............................................ 260/239.3
D

[56] References Cited
UNITED STATES PATENTS
3,553,206  1/1971  Wehrli et al. .................  260/239.3 D

*Primary Examiner*—Henry R. Jiles
*Assistant Examiner*—Robert T. Bond
*Attorneys*—Samuel L. Welt, Jon S. Saxe, Bernard S. Leon and William G. Isgro ABSTRACT: The present invention relates to processes for the preparation of 7-lower alkanoyl-1,4-benzodiazepin-2-ones utilizing ceric salts. The 7-lower alkanoyl benzodiazepin-2-ones are known to be useful as muscle relaxants, sedatives and anticonvulsants.

PROCESS FOR PREPARING 7-LOWER ALKANOYL BENZODIAZEPINES UTILIZING CERIC SALTS

RELATED APPLICATIONS

This application is related to application Ser. No. 838,677 filed July 2, 1969, now abandoned and application Ser. No. 877,490 filed Nov. 17, 1969, now U.S. Pat. No. 3,553,206, both in the names of Pius Anton Wehrli, Rodney Ian Fryer, and Leo Henryk Sternbach. It is also related to application Ser. No. 28,935, filed Apr. 15, 1970 in the names of Robert Ye-fong Ning and Leo Henryk Sternbach, and application Ser. No. 34,532 filed May 4, 1971 filed in the names of Robert Ye-fong Ning and Leo Henryk Sternbach.

DETAILED DESCRIPTION OF THE INVENTION

In our prior application Ser. No. 28,935 filed Apr. 15, 1970, referred to above, there is described in a process for synthesizing 7-lower alkanoyl benzodiazepines from 5-lower alkanoyl benzophenones. Such 5-lower alkanoyl benzophenones are prepared via the oxidation of a 5-lower alkyl benzophenone with a permanganate. The so-obtained 5-lower alkanoyl benzophenone is then cyclized to the desired 7-lower alkanoyl benzodiazepine in accordance with the procedures fully described in our prior application.

By the present invention there is provided a general procedure which permits either the conversion of a 5-lower alkyl benzophenone to a 5-lower alkanoyl benzophenone or the conversion of a 7-lower alkyl-benzodiazepin-2-one to a 7-lower alkanoyl benzodiazepin-2-one.

Specifically, the present invention involves in one process aspect, the preparation of a compound selected from the group consisting of a compound of the formula

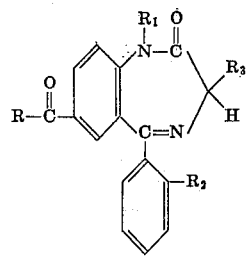

I wherein
R$_1$ and R$_3$ are selected from the group consisting of hydrogen and lower alkyl and
R$_2$ is selected from the group consisting of hydrogen and halogen and
R is H or lower alkyl
via the treatment of a compound of the formula

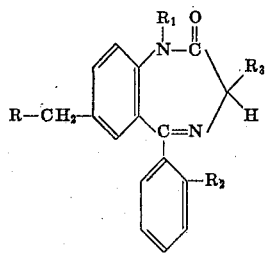

II wherein
R is selected from the group consisting of hydrogen and lower alkyl and
R$_1$, R$_2$ and R$_3$ are as above
with a ceric salt.

In another process aspect, the invention relates to the preparation of a benzophenone of the formula

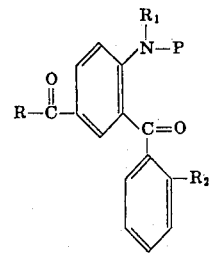

III wherein
R, R$_1$, and R$_2$ are as above and
P is any suitable nitrogen atom protecting system
via the treatment of a benzophenone of the formula

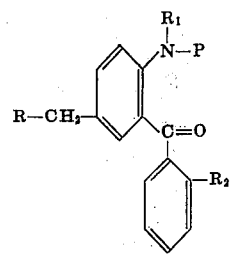

IV wherein R, R$_1$, and R$_2$ are as above
with a ceric salt.

In either of the process aspects set forth above, a compound of the formula II above or a compound of the formula IV above is added to any appropriate inert reaction medium and to the resultant medium, there is added a ceric salt.

As a suitable inert reaction medium, there can be utilized an inert organic solvent such as C$_1$ –C$_7$ saturated fatty acid, e.g., formic acid, acetic acid, propionic acid and the like, or a dilute aqueous mineral acid such as dilute nitric acid. It should be evident that all that is required of the inert organic solvent utilized is that the ceric ions formed be stable therein and also that both the ceric salt and the starting material of the formula II above or the formula IV above be soluble therein. Thus, the artisan will readily recognize the myriad of solvents suitable for the purposes of the present invention.

Ceric salts, for use in the process of the present invention, may be represented by ceric ammonium nitrate, ceric nitrate, ceric sulfate or any other suitable ceric salts.

While temperature is not critical to a successful performance of the process of the present invention, it is preferred to perform the reaction at a temperature range of from between about 0° to about 50° C., most preferably at room temperature.

From the above, it should be evident that the manner of bringing together the reaction partners (i.e., a ceric salt and either a compound of the formula II above or of the formula IV above) is not of primary importance ro a successful performance of the disclosed processes and hence, the particular manner of carrying out the reaction is largely a matter of convenience.

In a preferred embodiment, the reaction is carried out in the presence of an inert organic solvent of the type set forth above. It should be appreciated that the use of a solvent will ordinarily allow the reaction to proceed in a relatively simple manner, which avoids the use of extraordinary conditions, extensive equipment and the like.

In a preferred process aspect, either a compound of the formula II or a compound of the formula IV above is added to an appropriate inert organic solvent which is preferably a lower fatty acid such as acetic acid. To the resultant solution there is added a ceric salt, most preferably, ceric ammonium nitrate dissolved in water. The resultant reaction mixture is then permitted to stand at room temperature. The product of the formula I or of the formula III above which results is thereafter isolated.

In an especially preferred embodiment, the ceric salt utilized is ceric ammonium nitrate and the R—CH$_2$—group present on either the compound of the formula II above or the formula IV above is an ethyl group so that there can be obtained respectively a 7-acetyl-benzodiazepine of a 5-acetyl-benzophenone. However, other lower alkyl group containing compounds such as a 7-propyl, 7-butyl, 7-isobutyl, 7-pentyl benzodiazepine of the formula II above or a 5-propyl, a 5-butyl, a 5-pentyl or a 5-isobutyl benzophenone of the formula IV may also be utilized with equal efficaciousness so as to obtain the corresponding compound of the formula I or III above.

In the formula III and IV above, there is illustrated a grouping identified as P. This grouping is defined as a suitable nitrogen-protecting group. This group functions to prevent the nitrogen atom on the 2-amino function of a compound of the formula IV from participating in the reaction with the ceric salt whereby the formation of undersired side products can be avoided. Nitrogen-protecting groups are well known and can be represented by a lower alkanoyl group provided by acetic anhydride, acetyl chloride and the like. However, the literature describes a multitude of nitrogen-protecting groups which would be readily recognizable by the artisan as suitable for the purposes of the present invention.

As used herein, the term "lower alkyl" comprehends a straight or branched chain hydrocarbon group containing one to seven, preferably one to four carbon atoms in the chain such as methyl, ethyl, propyl, butyl and the like. The term "halogen" as utilized herein is intended to connote all four forms thereof, i.e., chlorine, bromine, fluorine, or iodine unless otherwise specified. The term "lower alkanoyl" represents the acyl moiety of a lower alkanoic acid (a lower alkyl

grouping) such as acetyl, propionyl, butyryl, isobutyryl, caproyl and the like. As used herein, it can also connote the acyl moiety of formic acid.

Preferably, R$_3$ is hydrogen in formula I or II above. Also, in a preferred embodiment, R$_2$ in the formulas above is hydrogen or fluorine. Suitably, the lower alkanoic group in position-7 of the benzodiazepine of the formula I above or in position-5 of the benzophenone of the formula III above has two to four carbon atoms and is most preferably acetyl. Thus, the most preferred compound within the class illustrated in the formula above are those which bear an acetyl group in position-7 of the benzodiazepine either prepared directly or via the intermediate of the formula IV above and have R$_1$ as hydrogen or lower alkyl, preferably, methyl; R$_2$ as hydrogen or fluorine and R$_3$ as hydrogen.

The compounds of the formula III can be converted into 7-lower alkanoyl benzodiazepine as is indicated above in accordance with the procedure found in our prior application Ser. No. 28,935 filed Apr. 15, 1970 in the Patent Office titled "Process for the Preparation of 7-Alkanoyl Benzodiazepines."

The compounds of the formula I are useful as anticonvulsants, sedatives and muscle relaxants. Such compounds can be formulated into pharmaceutical preparations in admixture with a capable pharmaceutical carrier and can be administered enterally or parenterally with dosage adjusted to suit the exergencies of a pharmacological situation.

The following examples are illustrated but not limitative of the present invention. All temperatures are stated in degrees Centigrade.

EXAMPLE 1

A solution of 132 mg. (0.50 mmole) of 7-ethyl-1,3-dihydro-5-phenyl-1,4-benzodiazepin-2-one in 4 ml. of glacial acetic acid was mixed with a solution of 1.10 g. (2.0 mmoles) of ceric ammonium nitrate in 4 ml. of water. The mixture, a clear solution, was allowed to stand at room temperature. After one day, the mixture was diluted with 50 ml. of water and extracted twice with equal volumes of methylene chloride. The combined methylene chloride layers was washed twice with water, dried over anhydrous sodium sulfate and evaporated to dryness. The residual yellow gum was separated by preparative thin-layer chromatography (silica gel, Brinkmann PF 254, 2 mm. thick, two plates measuring 20×20 cm.; ether used as eluent). 7-acetyl-1,3-dihydro-5-phenyl-1,4-benzodiazepine-2-one was isolated as a gum which crystallized from a small volume of acetonitrile as light yellow prisms, m.p. 187°–189°.

In a similar manner, 1,3-dihydro-7-ethyl-5-(2-fluorophenyl)-2H-1,4-benzodiazepin-2-one can be treated with ceric ammonium nitrate to give 7-acetyl-1,3-dihydro-5-(2-fluorophenyl)-2H-1,4-benzodiazepin-2-one as yellow prisms, m.p. 211°–213°.

Also, in a similar manner, 1,3-dihydro-5-phenyl-7-propyl-2H-1,4-benzodiazepin-2-one can be treated with ceric ammonium nitrate to give 7-propionyl-1,3-dihydro-5-phenyl-2H-1,4-benzodiazepin-2-one.

As in this example, 7-butyl-1,3-dihydro-5-phenyl-2H-1,4-benzodiazepin-2-one can be treated with ceric ammonium nitrate to give a 7-butyryl-1,3-dihydro-5-phenyl-2-H1,4-benzodiazepin-2-one.

EXAMPLE 2

A solution of 0.50mmole of 2-acetamido-5-ethyl-benzophenone in 4 ml. of glacial acetic acid was mixed with a solution of 2.0 mmoles of ceric ammonium nitrate in 4 ml. of water. The mixture, a clear solution, was allowed to stand at room temperature. After 1 day, the mixture was diluted with 50 ml. of water and extracted twice with equal volumes of methylene chloride. The combined methylene chloride layers was washed twice with water, dried over anhydrous sodium sulfate and evaporated to dryness. The residual yellow solid was washed with water. After recrystallizations from ethanol, 2-acetamido-5-acetylbenzophenone was obtained as colorless needles, m.p. 115°–116°.

In a similar manner, 2-acetamido-5-butylbenzophenone can be treated with ceric ammonium nitrate to give 2-acetamido-5-butyrylbenzophenone, m.p. 125°–126.5°.

We claim:

1. A process for preparing a compound of the formula

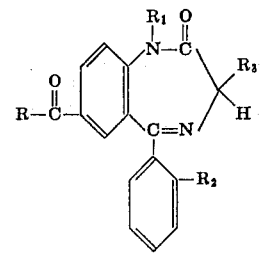

wherein
R, R$_1$, and R$_3$ are all selected from the group consisting of hydrogen and lower alkyl and
R$_2$ is selected from the group consisting of hydrogen and halogen
which comprises treating a compound of the formula

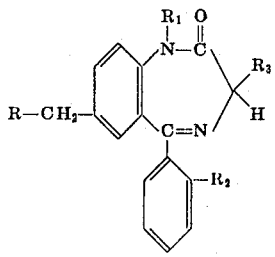

wherein
R, $R_1$, $R_2$, and R3 are as above
with a ceric salt.

2. A process as in claim 1 wherein the ceric salt utilized is selected from the group consisting of ceric ammonium nitrate, ceric nitrate and ceric sulfate.

3. A process as in claim 1 wherein the formula illustrated therein R is methyl and $R_3$ is hydrogen.

4. A process as in claim 3 wherein the ceric salt is selected from the group consisting of ceric ammonium nitrate, ceric nitrate and ceric sulfate.

5. A process as in claim 4 wherein in the formula illustrated R is methyl, $R_3$ is hydrogen, $R_2$ is hydrogen, fluorine or chlorine, and $R_1$ is selected from the group consisting of hydrogen and methyl.

* * * * *